United States Patent [19]

Evans et al.

[11] Patent Number: 5,631,954

[45] Date of Patent: May 20, 1997

[54] METHOD AND APPARATUS FOR CONTROLLING A TELEPHONE

[75] Inventors: Ronald A. Evans; Deborah L. Pinard, both of Kanata; Thomas A. Gray, Carp; Ken Henderson, Kanata; William Lim, Ottawa, all of Canada

[73] Assignee: Mitel Corporation, Kanata, Canada

[21] Appl. No.: 364,620

[22] Filed: Dec. 27, 1994

[51] Int. Cl.⁶ .................................................. H04M 11/00
[52] U.S. Cl. .................. 379/201; 379/94; 379/96; 379/202
[58] Field of Search .................................. 379/201, 207, 379/165, 355, 202, 93, 112, 96, 157, 164, 354, 142, 67, 156, 94; 370/62

[56] References Cited

U.S. PATENT DOCUMENTS

| | | | |
|---|---|---|---|
| 4,788,720 | 11/1988 | Brennan et al. | 379/355 |
| 4,866,758 | 9/1989 | Heinzelmann | 379/94 |
| 4,897,866 | 1/1990 | Majmudar et al. | 379/201 |
| 4,905,274 | 2/1990 | Cooper et al. | 379/165 |
| 5,065,425 | 11/1991 | Lecomte et al. | 379/93 |
| 5,195,086 | 3/1993 | Baumgartner et al. | 379/202 |
| 5,309,509 | 5/1994 | Cocklin et al. | 379/165 |
| 5,355,404 | 10/1994 | LeDuc et al. | 379/201 |
| 5,425,097 | 6/1995 | Pula | 379/201 |
| 5,461,666 | 10/1995 | McMahan et al. | 379/201 |
| 5,473,679 | 12/1995 | La Porta et al. | 379/201 |
| 5,491,743 | 2/1996 | Shiio et al. | 379/202 |
| 5,491,798 | 2/1996 | Bonsall et al. | 379/202 |

FOREIGN PATENT DOCUMENTS

| | | |
|---|---|---|
| 2284126 | 5/1995 | United Kingdom . |
| WO94/23523 | 10/1994 | WIPO . |

*Primary Examiner*—Krista M. Zele
*Assistant Examiner*—Scott Wolinsky
*Attorney, Agent, or Firm*—Charles E. Wands

[57] ABSTRACT

A communication system comprised of a computer system connected to a local area network (LAN), a local area communications system (LAX) connected to the LAN including plural line circuits, plural telephones connected to the LAX via the line circuits, one of which is associated with the computer system, control apparatus in the computer for sending messages to the LAX via the LAN for controlling the telephone associated with the computer system, an auxiliary keyboard associated with the one telephone associated with the computer system, connected to the computer system for commanding the control apparatus to send messages to the LAX to control the one telephone.

20 Claims, 5 Drawing Sheets

METHOD AND APPARATUS FOR CONTROLLING A TELEPHONE

FIELD OF THE INVENTION

This invention relates to the field of telephony and in particular to a telephone communication system.

BACKGROUND TO THE INVENTION

Some personal computer systems contain telephone application programs which can perform some functions which the user can use to partly automate the establishment and clearing of a telephone call. For example, such computer systems can contain a modem, into which a telephone set (telephone) is connected. The telephone application program can cause storage of a telephone directory of telephone numbers, and after the user requests the telephone directory to be displayed and one number is selected, the telephone application program causes the modem to seize a subscriber line to which the modem is connected, then causes a DTMF generator in the modem to dial the selected number. A telephone application program which can perform this function is WinFax Pro, sold by Delrina Corporation of Toronto, Canada. Other application programs which can perform the seizing and dialing functions are the communication program modules of the program Microsoft Works and of the program Windows 3.1, both sold by Microsoft Corporation, and Sidekick from Borland Corporation.

The aforenoted telephone application programs are of the "point and click" variety, in which a number is either selected by a cursor pointed at by cursor keys, a mouse, or the equivalent, and invoked by depressing a switch button (often referred to as a "click") or by depressing an "enter" key on the keyboard of the computer. The kinds of operations that can be invoked by these telephone application programs are very limited, e.g. causing seizure of a line and dialing or redialing a keyed or selected number.

Special calling features often provided by an advanced telephone service, such as automatically setting up a conference call, for example, are not possible to be performed by such telephone application programs. Further, if the personal computer is inoperative or switched off, the telephone cannot be used unless the telephone set is physically disconnected from the computer system (usually involving having to turn a cumbersome computer around to access its rear), and then is physically reconnected to the subscriber line via a phone jack, which often involves also first disconnecting the modem from the phone jack.

SUMMARY OF THE INVENTION

The present invention is a communication system which allows automatic provision of sophisticated and advanced special calling features using a personal computer, but at the same time allows the telephone set to be used even if the personal computer is inoperative. The features can be, for example, automatic setting up of a conference call, speed calling, calling by name, determining the status of a line to be called before dialing, automatic ringback on busy, etc.

In accordance with an embodiment of the invention, a communication system is comprised of a computer system connected to a local area network (LAN), a local area communications system (LAX) connected to the LAN, including plural line circuit, plural telephones connected to the LAX via the line circuits, one of which is associated with the computer system, control apparatus in the computer for sending messages to the LAX via the LAN for controlling the telephone associated with the computer system, an auxiliary keyboard associated with the one telephone associated with the computer system, connected to the computer system for commanding the control apparatus to send messages to the LAX to control the one telephone.

BRIEF INTRODUCTION TO THE DRAWINGS

A better understanding of the invention will be obtained by reading the description of the invention below, with reference to the following drawings, in which.

DETAILED DESCRIPTION OF THE INVENTION

Figure 1:
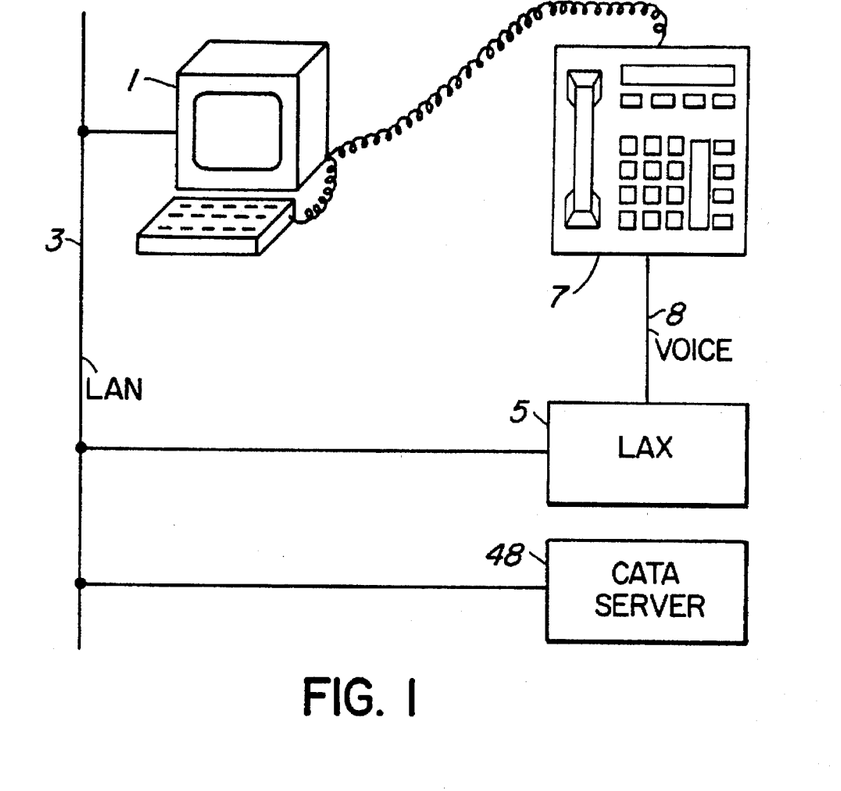
FIG. 1 is a block diagram of a preferred embodiment of the invention.

Turning to FIG. 1, a personal computer 1 is connected to a LAN 3. A local area telephone exchange (LAX) 5 is also connected to the LAN 3. A telephone set 7 is connected to the LAX 5. The arrangement so far described is as described in the U.S. patent application entitled "Local Area Communications Server System", Ser. No. 08/399,463, filed on Nov. 14, 1994, and assigned to Mitel Corporation, and which is incorporated herein by reference.

Figure 2:
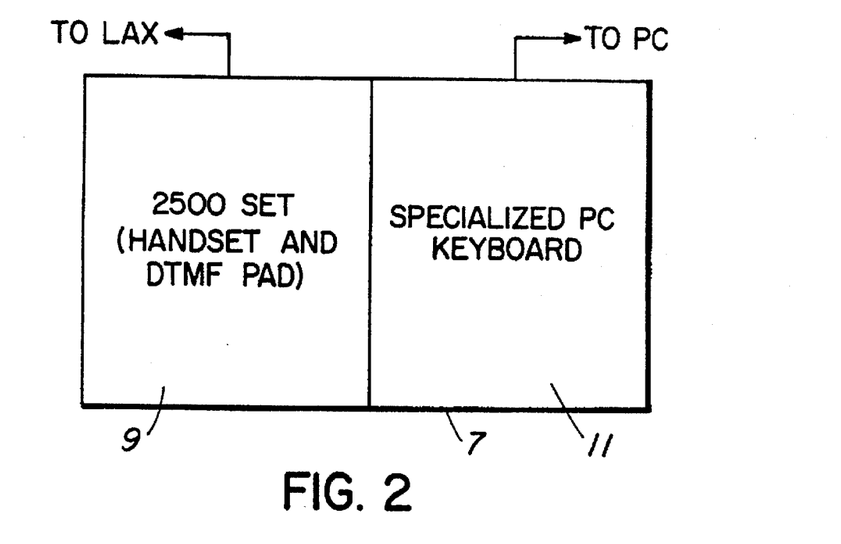
FIG. 2 is a block diagram of a telephone set as used in the present invention.

Turning now to FIG. 2, the telephone set 7 is formed in two sections, one section 9 comprising a normal telephone, and another section 11 being comprised of a specialized keypad or keyboard (referred to below as a keyboard). The normal telephone 9 is connected to the LAX as described in the aforenoted patent application, and the specialized keyboard 11 is connected to a standard I/O port of the computer.

The keyboard 11 is preferably comprised of a switch matrix connected to a keyboard controller (microprocessor), which is connected to a personal computer interface circuit, and a power supply for these.

Figure 3:
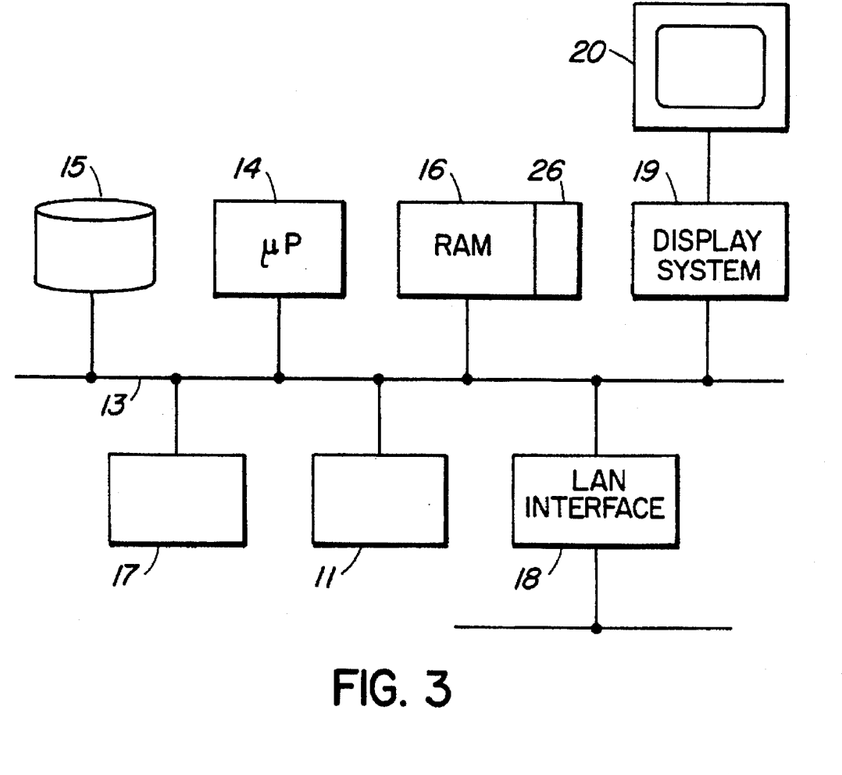
FIG. 3 is a block diagram of a personal computer showing connection of part of the telephone set of FIG. 2.

FIG. 3 illustrates a block diagram of a well known personal computer 1, and is formed of an expansion bus 13, and a microprocessor 14, a mass storage device such as a hard disc drive 15, random access memory (RAM) 16, a keyboard 17, a display subsystem including a graphics circuit 19 and a LAN interface 18 connected to the expansion bus 13. A computer display 20 is connected to the display subsystem. The LAN interface 18 is connected to the LAN 3. The specialized keyboard 11 is connected to the expansion bus 13 through a standard serial port.

Figure 4:
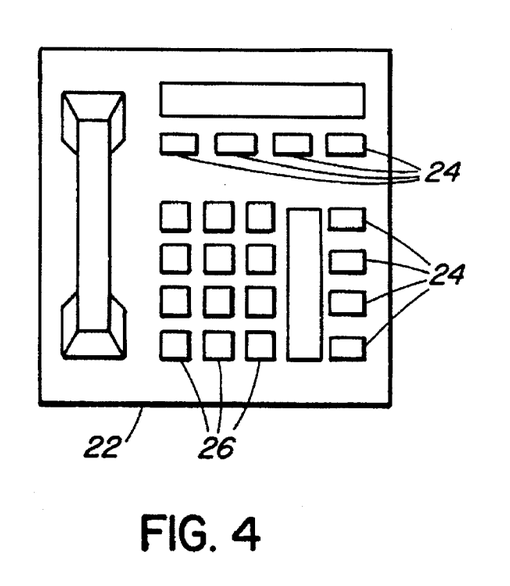
FIG. 4 is an illustration of a displayed telephone set on a personal computer display.

A telephone set application program is stored on the hard drive 15, which for example can be based on the Microsoft Corporation TAPI standard, or Novell Corporation TSAPI standard. It should present a graphical user interface (GUI) which displays a telephone set to the user on the display 20, such as is shown in FIG. 4. The GUI can be created in a manner similar to the manner in which a calculator is displayed in the aforenoted Sidekick program, in which a calculator device is shown, complete with keys which correspond to actual calculator keys. In that program, when the keys are "clicked", commands are presented to a calculator application program residing in RAM 16 after being moved there by microprocessor 14 from hard drive 15. In that case the displayed keys are mapped to actual keys on the computer keyboard calculator keypad.

In the present invention, it is desired that the GUI of the telephone set 22 should designate specialized telephony features, and should have specialized feature keys 24, as well as a normal dialing keypad 26. Each specialized feature key translates into a macro, a normal keyboard keystroke combination that has special meaning to the telephone application program residing memory of the personal computer 1. The GUI and the corresponding commands and macros can be generated using the programming techniques described in the textbook "Programming Windows 3.1", by Charles Petzold, published by Microsoft Press of Redmond, Wash., U.S.A., copyright 1992.

Once invoked, the application program is moved by the microprocessor from hard drive 15 to the RAM 16, and the GUI of the telephone set 22 is displayed on the display 20 of the personal computer. Depressing the keys of specialized keyboard 11 causes corresponding keys of the displayed telephone set 22 to be shown as depressed (invoked), causing macros to be generated and responded to by the telephone application program stored in RAM 16. The application program causes the personal computer to send commands to the LAX via the LAN 3, causing it to carry out the feature requested.

It should be noted that the keys on the specialized keyboard 11 and the buttons on the displayed telephone set should be mapped to functions of the telephone application program. This mapping should be stored in a database record 26 in RAM 16, for easy and quick availability by the microprocessor operating the application program.

It is preferred that the telephone application should allow the user to customize the buttons on the displayed telephone set 22. For example, a technique used to automate access to a public database service which requires dialing of a number, waiting for dial tone, depressing a return key, waiting for a welcome message, entering a user number, waiting for a response and entering a password, is the recording of a manually invoked sequence which can be later invoked by means of a macro. Such a technique is provided for in the program Mirror, sold by Mirror Technologies Corp. The telephone application used in the personal computer can utilize this recording technique to assign a macro to a particular feature button on the GUI.

For example, after starting the telephone application program which displays the telephone set 22 on the display 20 of the personal computer 1, a pair of feature buttons 24 can be depressed by closing a pair of keys on keyboard 11, one of which can designate "memorize" and the other "conference". The user then lifts his handset, gaining access to the LAX in a manner to be described below. The user then creates a conference call by dialing one called party, waiting for the called party to answer, making the statement into the telephone handset "please hold for a conference call with Jane Doe", placing the caller on soft hold by depressing a hold key on the keyboard 11 which is reflected in the displayed telephone set 22 key 24, dialing another party, repeating the same sequence, then depressing the "conference" key again. The application program should record the key depression sequence as a sequence of macros and store them in the database record in RAM 16 (and subsequently in hard drive 15) which maps to the "conference" key 24.

For subsequent conferences, the user need only depress the "conference" key. The application program can display a dialog box on the display 20 which requests the telephone numbers of the other parties to the conference. The user merely types them into the space shown in the dialog box, and depresses the enter key on the keyboard 11 or the OK button on the telephone set 22. The application program then sends commands via the LAN 3 to the LAX to dial the number of the first called conferee, as described in the aforenoted patent application. Once the first called conferee has answered (confirmed by response message from the LAX to the application program), the application program retrieves from the data base record (which can be a pointer to a voice message storage device address) and replays the recorded message via the LAN and the LAX to the called conferee's subscriber line and sends a message to the LAX to place that line on hold. The LAX then informs the application program that this command has been carried out. It then sends a message to the LAX to dial the next called conferee, and the process is repeated. Once all the dialed parties have answered and have been placed on soft hold, the telephone application program sends a message to the LAX to release the lines of the parties from hold and connect them via a bridge in a conference call arrangement.

The application program can be designed to either allow the local user to monitor the connection proceedings audibly via any or all of the local loudspeaker of the personal computer, by handset earpiece, and by reporting message displayed graphically and/or by print message in a dialog box on the personal computer display.

In the absence of operation of the personal computer, the telephone set 9 operates with the LAX 5 as a normal telephone set. A line circuit of the LAX monitors the seizure status of the subscriber line to which the telephone set 9 is connected, and provides dial tone. A DTMF receiver detects dialed digits, and sends the dialed digits to a PBX, or connects the subscriber line to a dialed subscriber line if the latter is available for connection by the LAX. Thus this allows the telephone set to be used for normal unfeatured calls, or calls having features provided by the LAX or the combination of the LAX and other subsystems to which it is connected.

With the personal computer and telephone application program operating, however, the latter should send a message to the LAX via the LAN, to report all activity occurring on the telephone set line to the telephone application program via the LAN, and not to carry out any function based on that activity unless commanded by the telephone application program.

In other words, the active telephone application program should take ownership of the telephone set. If the telephone set goes off hook, the LAX should detect this status and report it to the telephone application program. The telephone application program then should instruct the LAX to provide dial tone to the telephone set. The LAX should the monitor the subscriber line for DTMF dialing, and report the values to the telephone application program. The telephone application program can determine whether a special feature button had been depressed, and if so, interpret the DTMF values to the feature requested, and command the LAX to provide the feature.

The personal computer can provide regular messages to the LAX to inform it that it and the telephone application program is or are operational.

With the personal computer powered off, no such messages are received by the LAX, and it takes ownership of the line, responding to the status and DTMF signals carried by the subscriber line. It is trivial to note that in this case there would be no GUI available to the user, and thus the special features not available.

Several other embodiments providing special features will be described later. However, other embodiments of the structure of the invention will first be described.

Figure 5:
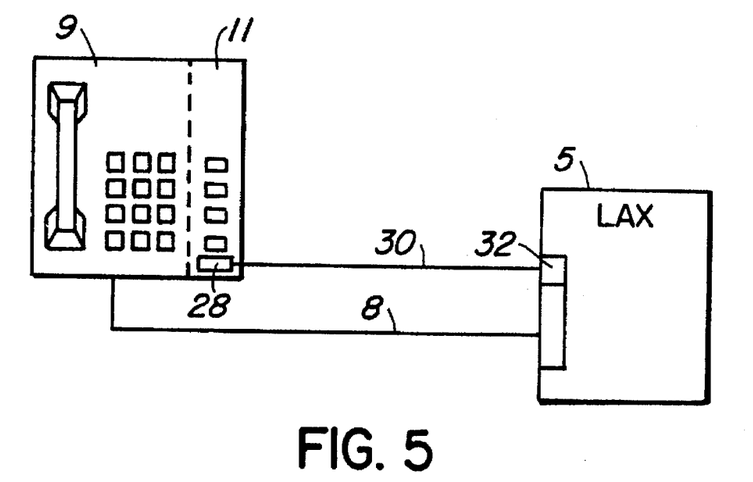
FIG. 5 is a block diagram illustrating part of the present invention in which intercom is provided.

FIG. 5 illustrates a block diagram of an embodiment in which intercom is provided. The specialized keyboard 11 in this case contains a loudspeaker connected to an intercom circuit 28. There is a bidirectional intercom line 30 connected between the intercom circuit 28 and an intercom circuit 32 of the LAX, and is in addition to besides normal voice line 8 connecting the telephone set to LAX 5. Using the intercom connected to the specialized keyboard, the telephone user can be given intercom service without the use of the telephone application program stored by the personal computer.

Figure 6:
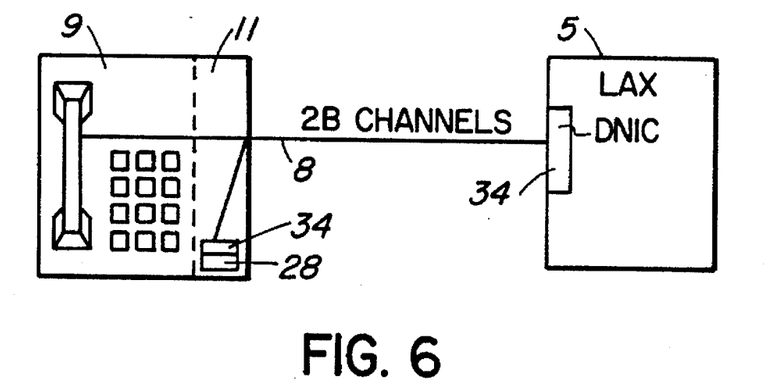
FIG. 6 is a block diagram illustrating part of the present invention in which intercom is provided in a different manner than in FIG. 5.

As shown in FIG. 6, 2B +D channels from the intercom circuit can be used to provide the intercom service, if the telephone set is of digital type. The 2B +D channels are carried over line 8, between two digital network interface circuits 34, sold as DNICs by Mitel Corporation. 2B +D channels from a telephone set to a LAX are described and illustrated in the aforenoted patent application.

Figure 7:
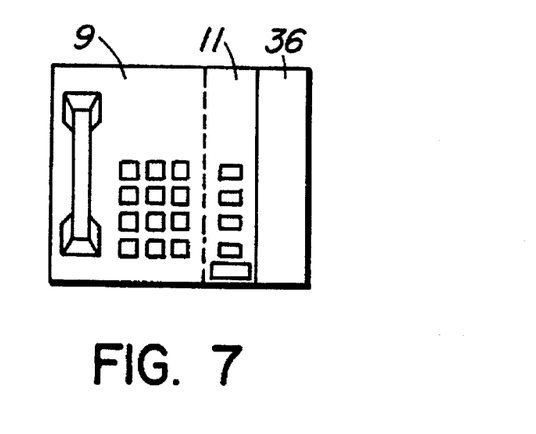
FIG. 7 is a block diagram illustrating part of the present invention in which handsfree operation can be provided.

As shown in FIG. 7, a handsfree control circuit 36 can be connected to the keyboard 11. Such control circuits are known, and provide automatic switching between locally originated voice and received voice to the local loudspeaker, based on an algorithm, such as loudest talker, etc.

While analog and digital intercom and handsfree service is well known, it has not previously been provided in the context of the present invention, wherein invoking of intercom or handsfree operation of a telephone set is provided by means of a GUI on a personal computer taking over control of the telephone set from a LAX, and controlling the provision of special services thereby.

Thus, for example, once the telephone application program has informed the LAX that it has control of the telephone set, and has provided the telephone set 22 on the personal computer display with an array of special features buttons, the user need only depress those buttons on the special keyboard or by clicking them using a pointing device to control the intercom or handsfree operation. Such control can be, for example, switching on and off, volume control, tone control, control of the sound based on echo or room characteristics, provision of background music, merging of another sound source into the signal carried by the intercom or telephone line, etc.

Figure 8:
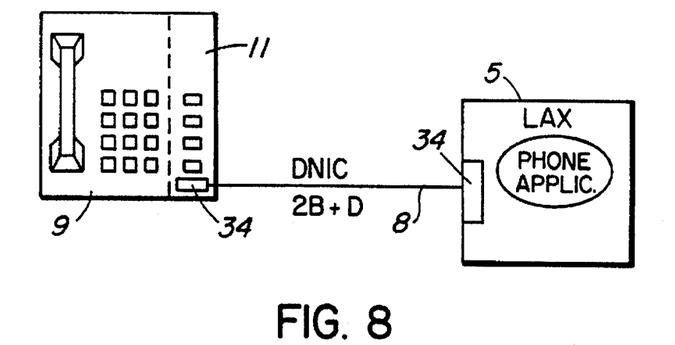
FIG. 8 is a block diagram illustrating part of the present invention in accordance with another embodiment.

In accordance with another embodiment, as shown in FIG. 8, the telephone application program is stored by the LAX itself. The special keyboard 11 is connected via a DNIC 34 and 2B +D channel to a DNIC 34 connected to the LAX 5. The user in this case does not have a personal computer display to illustrate via a GUI the various features available by displayed buttons. However the telephony features that can be invoked are recognized by means of the key caps or printing on the housing of the keyboard.

It should be recognized that since the keyboard includes a keyboard controller, it could also include a display, such as a liquid crystal display, driven by the keyboard controller, which provides informational feedback to the user as to the status of a special feature call controlled by the telephone application program operated by the LAX.

In accordance with this embodiment, the telephone application program operates constantly in the LAX, allowing the telephone set user to communicate with it by means of the special keyboard 11, and obtain the functioning of special telephone features, such as speed dialing, etc. In case the telephone application program is inoperative, the telephone 9 can be used to place and receive normal calls, as described earlier.

Figure 9:
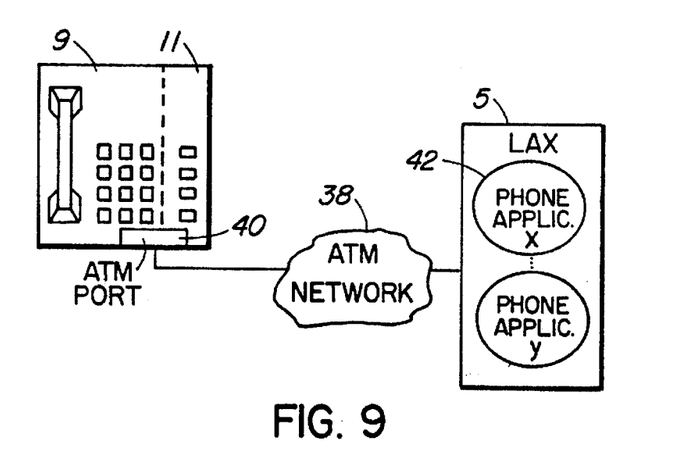
FIG. 9 is a block diagram illustrating part of the present invention in accordance with another embodiment.

FIG. 9 illustrates another embodiment of the present invention, which is a variation of the embodiment shown in FIG. 8. In this case, the telephone set 9 is connected to the LAX via an asynchronous transfer mode (ATM) network 38, via an ATM port 40. The telephone in this case is a digital set, which contains a controller having an ATM address. The keyboard 11 controller is connected to the controller having the ATM address. The LAX contains a telephone application program 42 for each telephone of the described type connected to it. The keystrokes of the keyboard 11 are routed to the correct telephone application program in the LAX using the ATM address. In this manner, each such telephone connected to the LAX can have its own application program and its own style of keyboard 11 (either or both of which could be different for various subscribers, depending on classes or levels of services arranged for), and its own database record storing macros to invoke various features, mapped to the keys of the keyboard 11.

It should be noted that rather than an ATM network, a high speed local area 802 Ethernet™ network could be used. The LAX and telephones 9 with keyboards 11 should be in the same MAC address space, or should be connected via a bridge. Alternatively, rather than an ATM network, a TCP/IP layer could be used, which allows communication beyond a segment through plural routers.

Figure 10:
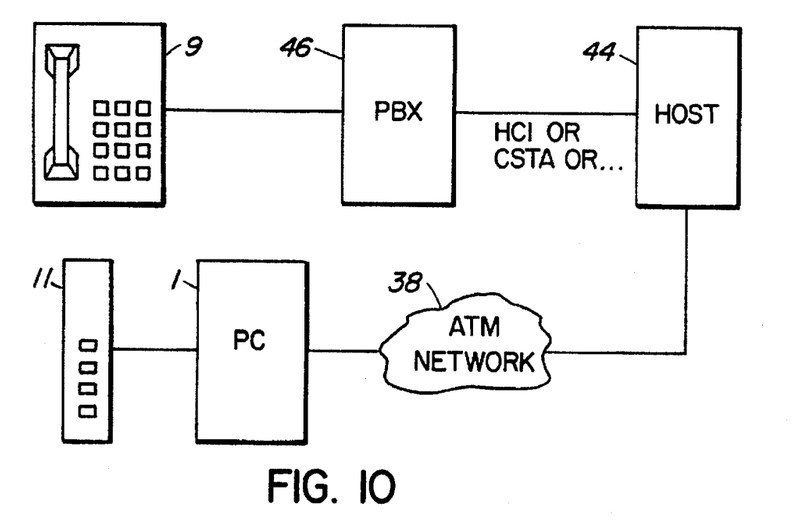
FIG. 10 is a block diagram illustrating part of the present invention in accordance with another embodiment.

FIG. 10 illustrates an embodiment of the invention in which the personal computer 1 of the first embodiment, to which the keyboard 11 is connected, is connected to a host computer 44 via an ATM 38, a high speed local area Ethernet™ network or other network, rather than via a LAN. The host computer 44 is connected to a PBX 44, via a data link such as Host Communication Interface (HCI), CSTA, or other link. The telephone set 9 is connected to the PBX.

In this case, rather than a LAX, a PBX 46 is controlled by the telephone application program of the personal computer 1. The personal computer thereby takes control of commanding the PBX to implement the special features requested by the user via the keyboard 11, and communicates via the network 38 or the equivalent and host computer 44 with the PBX.

It should be noted that this embodiment may be designed without personal computer 1, if the host computer stores the application programs. In that case the keyboard 11 would communicate via ATM or other network with the host, to obtain the special features, in a manner similar to that described above. In case the host computer or, if used the personal computer are inoperative, the telephone set 9 can be used with the PBX in a normal manner, in accordance with normal PBX service.

One way of providing telephone service in a self adaptive manner is described in U.S. patent application entitled "Adaptive Communication System", Ser. No. 08/257,917, filed Jun. 10th, 1994, and assigned to Mitel Corporation, and which is incorporated herein by reference. The system described in that patent application will be referred to herein as a CATA server. In the CATA server a user agent is assigned to each telephone user. A CATA server 48 is shown in FIG. 1 connected to the LAN 3.

Figure 11:
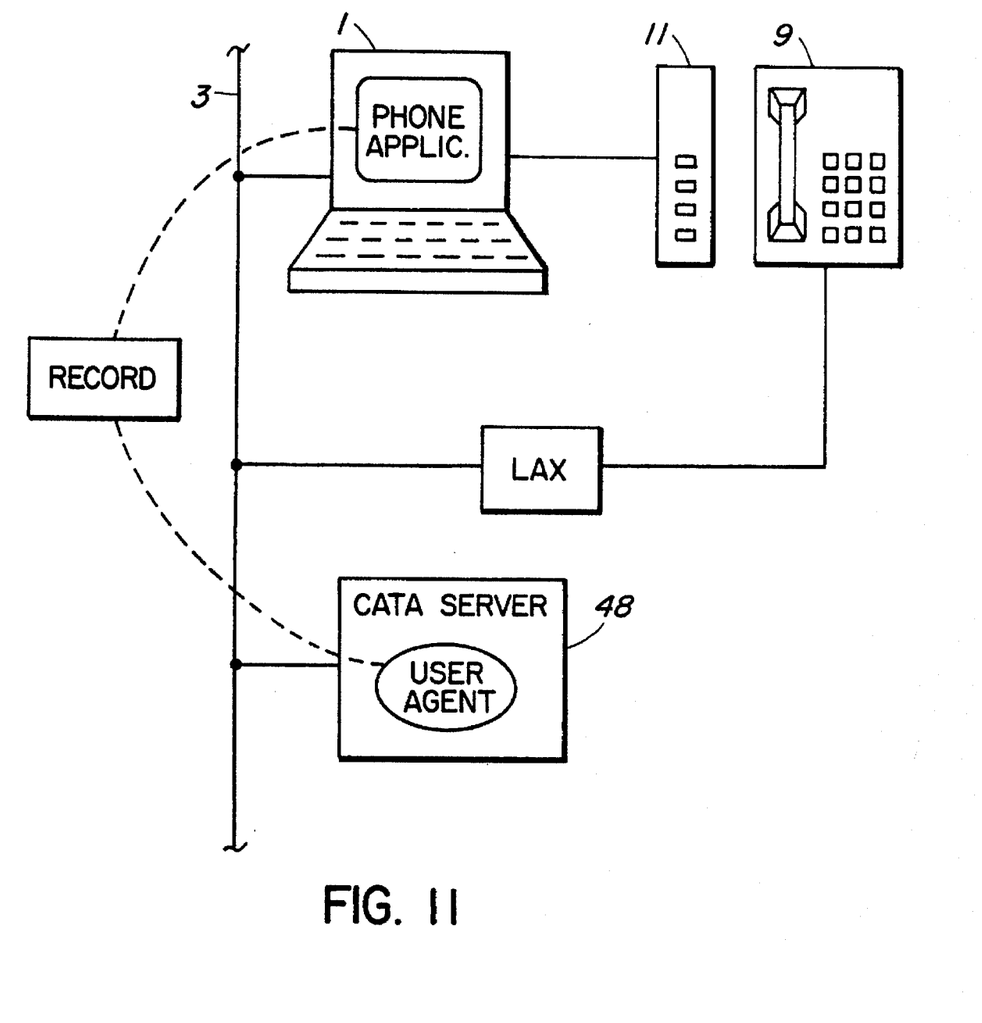
FIG. 11 is a block diagram illustrating part of the present invention in accordance with another embodiment.

It is preferred that the mapping of the keys of keyboard 11 should be transmitted by the telephone application program from personal computer to the CATA server 48 as shown in FIG. 11, for storage with the user agent for the particular subscriber, instead of being stored with the telephone application program in the personal computer 1. The benefit of this structure is that when the telephone set is made known to the CATA server as being active, in order to operate in the manner described in the latter patent application, the mapping of the keys of the keyboard 11 will automatically be known for the corresponding telephone set.

Communication between the personal computer 1, the LAX 5 and the CATA server 48 can be made via LAN or ATM or other network personal computer, and in this case the personal computer will have a specialized ATM interface circuit connected to the ATM network. The telephone set can be connected directly to that circuit for communication with the LAX and/or CATA server, rather than having a separate voice line to the LAX.

A person understanding this invention may now conceive of alternative structures and embodiments or variations of the above. All of those which fall within the scope of the claims appended hereto are considered to be part of the present invention.

We claim:

1. A communication system comprising:

(a) a computer system connected to a local area network (LAN), (b) a local area communications system (LAX) connected to the LAN including plural line circuits, (c) plural telephones connected to the LAX via the line circuits, one of which is associated with the computer system, (d) control means in the computer system for sending messages to the LAX via the LAN for controlling the telephone associated with the computer system, and (e) an auxiliary keyboard associated with said one telephone associated with the computer system, connected to the computer system for commanding said control means to send messages to the LAX to control said one telephone.

2. A communication system as defined in claim 1 in which a map of keys of the auxiliary keyboard to commands for commanding said control means is stored in a database record.

3. A communication system as defined in claim 2 in which the database record is stored in a memory of the computer system.

4. A communication system as defined in claim 2, further including a user agent means in communication with the computer system via the LAN, the database record being stored in a memory accessible by the user agent.

5. A communication system as defined in claim 2, including a macro for commanding said control means to send messages to the LAX to control said one telephone mapped to a key, said macro being stored in said database record.

6. A communication system as defined in claim 5, in which the macro is a set of messages instructing the LAX to dial a first telephone number to place a call, send a recorded announcement to a called telephone associated with the first telephone number when a party designated by the first telephone number has answered the call, place an answered line associated with the called telephone on hold, dial a second telephone number to place a second call, send a recorded announcement to a called telephone associated with the second telephone number when a party designated by the second telephone number has answered the latter call, place an answered line associated with the latter called telephone on hold, connect a line associated with said one telephone to said lines on hold and remove the said lines from hold, thereby establishing a conference call.

7. A communication system as defined in claim 5, including a display controlled by the computer system for displaying a telephone having special feature buttons as a graphical user interface to a user of said one telephone, and for displaying as icons a library of special features on the display, the computer system comprising control means for storing macros in the database record in association with said special feature buttons for invoking features, upon dragging said icons over said special feature buttons, whereby at least one of said macros can be sent to the LAX for controlling the provision of special features upon selection of a special feature button.

8. A communication system as defined in claim 2 in which the database record is stored in a memory of the LAX.

9. A communication system as defined in claim 8, in which the computer system is contained in and forms part of the LAX, the LAN being comprised of simple conductors.

10. A communication system as defined in claim 9, including a display associated with the auxiliary keyboard for receiving commands from the computer system and displaying a telephone having special feature buttons as a graphical user interface to a user of said one telephone.

11. A communication system as defined in claim 9, in which said one telephone is connected to the LAX via an asynchronous transfer mode (ATM) network.

12. A communication system as defined in claim 9, in which said one telephone is connected to the LAX via a high speed network.

13. A communication system as defined in claim 1, the LAX including means for accepting telephone supervisory commands directly from said one telephone set in the event of inoperability of said control means in the computer system.

14. A communication system as defined in claim 13, in which the LAX includes an intercom control circuit, an intercom circuit including a loudspeaker associated with the auxiliary keyboard controllable by the intercom control circuit, whereby the LAX can control the intercom circuit by the intercom control circuit in the event of inoperability of said control means in the computer system.

15. A communication system as defined in claim 1, the LAX including means for monitoring telephone supervisory commands from said one telephone and for sending related commands to said computer system, whereby said control means, after receiving said related commands, can act to send said messages to the LAX.

16. A communication system as defined in claim 15, in which the LAX includes a handsfree control circuit, a handsfree circuit including a loudspeaker associated with the auxiliary keyboard controllable by the handsfree control circuit whereby the LAX can control the handsfree circuit by the intercom control circuit under control of said control means in the computer system.

17. A communication system as defined in claim 1, including a display associated with the auxiliary keyboard for receiving commands from the computer system and displaying a telephone having special feature buttons as a graphical user interface to a user of said one telephone.

18. A communication system as defined in claim 1, in which the LAN is comprised of an asynchronous transfer mode (ATM) network.

19. A communication system as defined in claim 18, in which the LAX is comprised of a first computer, and said one telephone is connected to the first computer via a private branch exchange (PBX).

20. A communication system as defined in claim 1, further including an adaptive communication (CATA) server connected to the LAN, the database record being stored in a memory of the CATA server associated with an agent of a user of said one telephone.

* * * * *